United States Patent
Alfonso Alegre et al.

(10) Patent No.: US 11,084,904 B2
(45) Date of Patent: Aug. 10, 2021

(54) METHOD FOR OBTAINING BIODEGRADABLE POLYESTERETHERAMIDE

(71) Applicant: SOCIEDAD ANONIMA MINERA CATALANO-ARAGONESA, Saragossa (ES)

(72) Inventors: Maria Jose Alfonso Alegre, Saragossa (ES); Patricia Zagalaz Lasierra, Saragossa (ES); Miguel Angel Caballero Lopez, Saragossa (ES)

(73) Assignee: SOCIEDAD ANONIMA MINERA CATALANO-ARAGONESA, Saragossa (ES)

( * ) Notice: Subject to any disclaimer, the term of this patent is extended or adjusted under 35 U.S.C. 154(b) by 15 days.

(21) Appl. No.: 16/304,009

(22) PCT Filed: May 30, 2016

(86) PCT No.: PCT/ES2016/070407
§ 371 (c)(1),
(2) Date: Nov. 21, 2018

(87) PCT Pub. No.: WO2017/207827
PCT Pub. Date: Dec. 7, 2017

(65) Prior Publication Data
US 2019/0202986 A1 Jul. 4, 2019

(51) Int. Cl.
| | |
|---|---|
| *C08G 69/44* | (2006.01) |
| *C08G 63/685* | (2006.01) |
| *C08G 69/40* | (2006.01) |
| *C08G 63/672* | (2006.01) |
| *C08G 63/688* | (2006.01) |
| *C08G 63/78* | (2006.01) |
| *B29B 7/00* | (2006.01) |
| *B29B 7/60* | (2006.01) |
| *C08J 3/20* | (2006.01) |
| *C08K 3/26* | (2006.01) |
| *C08K 3/36* | (2006.01) |
| *C08K 5/20* | (2006.01) |
| *C08L 77/12* | (2006.01) |
| *B29K 77/00* | (2006.01) |
| *B29K 509/02* | (2006.01) |

(52) U.S. Cl.
CPC .............. *C08G 69/44* (2013.01); *B29B 7/007* (2013.01); *B29B 7/60* (2013.01); *C08G 63/672* (2013.01); *C08G 63/6856* (2013.01); *C08G 63/6886* (2013.01); *C08G 63/78* (2013.01); *C08G 69/40* (2013.01); *C08J 3/201* (2013.01); *C08K 3/26* (2013.01); *C08K 3/36* (2013.01); *C08K 5/20* (2013.01); *C08L 77/12* (2013.01); *B29K 2077/00* (2013.01); *B29K 2509/02* (2013.01); *B29K 2995/006* (2013.01); *C08K 2003/265* (2013.01); *C08L 2201/06* (2013.01)

(58) Field of Classification Search
CPC .. C08G 69/44; C08G 63/672; C08G 63/6856; C08G 63/6886; B29B 7/007; B29B 7/60; B29K 2077/00; B29K 2509/02; B29K 2995/006
See application file for complete search history.

(56) References Cited

U.S. PATENT DOCUMENTS

| | | | | |
|---|---|---|---|---|
| 4,587,309 A | * | 5/1986 | Tanaka | C08G 69/44 525/419 |
| 5,342,918 A | * | 8/1994 | Howelton | C08G 69/40 525/420 |
| 5,880,220 A | | 3/1999 | Varzelhan et al. | |
| 6,521,717 B1 | | 2/2003 | Itoh | |
| 8,648,168 B2 | * | 2/2014 | Alfonso Alegre | C08G 69/40 528/332 |
| 2002/0028857 A1 | * | 3/2002 | Holy | C08L 1/00 523/124 |
| 2006/0052504 A1 | | 3/2006 | Xiu et al. | |
| 2011/0034662 A1 | | 2/2011 | Witt et al. | |
| 2011/0039999 A1 | | 2/2011 | Witt et al. | |
| 2011/0251340 A1 | * | 10/2011 | Debruin | C08J 3/122 524/599 |
| 2020/0317858 A1 | * | 10/2020 | Alfonso Alegre | C08G 63/183 |

FOREIGN PATENT DOCUMENTS

| | | |
|---|---|---|
| EP | 2628761 A1 | 8/2013 |
| EP | 2252643 B1 | 10/2013 |

OTHER PUBLICATIONS

International Search Report for corresponding PCT application No. PCT/ES2016/070407, dated Feb. 21, 2017.

* cited by examiner

*Primary Examiner* — Nicholas E Hill
(74) *Attorney, Agent, or Firm* — Notaro, Michalos & Zaccaria P.C.

(57) ABSTRACT

Method for obtaining biodegradable polyesteretheramide that has a stage of esterification and/or transesterification and amidation reaction, a stage of prepolycondensation, a stage of polycondensation, an optional stage of extraction, a stage of drying and a final stage of extrusion with additives. The method of obtaining PEEA enables better satisfaction of the needs of each client as regards viscosity, composition and additives. It enables reducing the amount of interface product that has lower commercial value and improves the colour of the product, while at the same time provides a more efficient process, ecologically cleaner and safer for all the operatives.

10 Claims, 1 Drawing Sheet

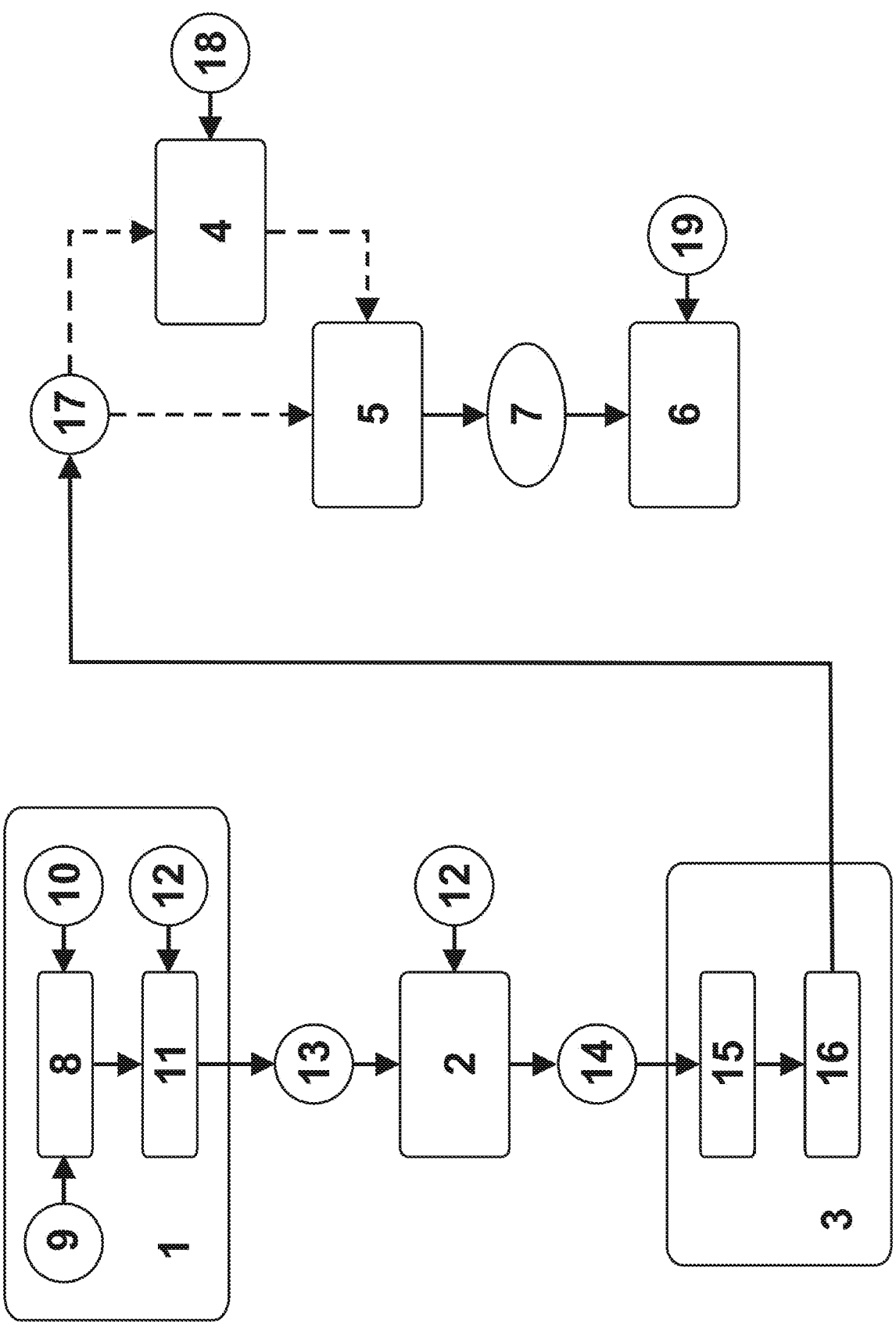

METHOD FOR OBTAINING BIODEGRADABLE POLYESTERETHERAMIDE

This descriptive specification refers, as the title indicates, to a method for obtaining biodegradable polyesteretheramide, which comprises a stage of esterification and/or transesterification and amidation reaction, a stage of prepolycondensation, a stage of polycondensation, an optional stage of extraction, a stage of drying and a final stage of extrusion with additives.

FIELD OF THE INVENTION

The invention is in the field of industrial methods for obtaining biodegradable polyesteretheramide, abbreviated as PEEA, based on aliphatic or aliphatic and aromatic dicarboxylic acids and aliphatic dihydroxy compounds, polyethertriamines and other monomers or additives.

BACKGROUND OF THE INVENTION

At present, as stated in EP2628761 "Poliestereteramida Biodegradable", biodegradable polyesteretheramide, also abbreviated as PEEA, is known for its use in the manufacture of films and moulded products, for example for food product protection applications and films for agriculture. Biodegradable polyesteretheramide contains a compound with at least three groups able to react with one or various types of active group present in the reaction mass, that is, compounds that contain ether groups in their structure have active groups able to react in the reaction mass to form amide groups.

The term biodegradable refers to the fact that polyesteretheramide decomposes outdoors in a reasonable length of time, generally through hydrolytic and/or oxidative degradation, enzymatically or by the influence of microorganisms such as bacteria, yeasts, fungi and algae. Specifically, polyesteretheramide shows a degree of biodegradability of at least 90% under the conditions specified in the DIN EN13432 standard. There are other methods for determining biodegradability such as ASTM D5338 and ASTM D6400.

EP2628761 "Poliestereteramida Biodegradable" also describes a 5-stage method for obtaining it that consists of:
- Esterification/amidation 1: Stage with temperature adjustments to remove the low boiling point by-products. Column temperature 65° C.
- Esterification/amidation 2: Stage with temperature adjustments to remove the low boiling point by-products. Column temperature 100° C.
- Prepolycondensation, reduction to vacuum and removal of excess compound 3.
- Polycondensation at high vacuum to achieve a product with molecular weight (MW) between 5,000 and 100,000 g/mol.
- Compound 6 (chain extender) is added to increase the molecular weight. Added to the still molten polymer from the polycondensation. In the reactor of stage 4, via a mixer or in subsequent processing. Extrusion, injection or physical mixing.

In summary, this method consists of two differentiated esterification/amidation stages, prepolycondensation, polycondensation and an addition of chain extenders.

There are also other methods on the market for producing biodegradable polymers, specifically for biodegradable polyesters, such as that of US2011/0039999 "Method for the continuous production of biodegradable polyesters" that describes a continuous production process for a biodegradable polyester that includes glycerol or Patent US2011/0034662 "Method for the continuous production of biodegradable polyesters" that also claims a continuous production process for a biodegradable polyester that includes a compound with 3 or more functional groups. These methods only describe the production of biodegradable polyesters.

DESCRIPTION AND ADVANTAGES OF THE INVENTION

This invention refers to a method for obtaining biodegradable polyesteretheramide, different from the known methods, that comprises various sequential stages:
- A first reaction stage of esterification and/or transesterification and amidation,
- A second stage of prepolycondensation,
- A third stage of polycondensation,
- A fourth optional stage of extraction,
- A fifth stage of drying,
- A sixth stage of extrusion.

As can be seen, there is a single esterification/amidation stage that reduces energy consumption and investment. The addition of the chain extender for increasing the molecular weight becomes optional in the extrusion stage. And, in terms of the product itself, it enables the formation of a random copolymer that promotes the biodegradability of the product.

Also, an optional extraction stage is introduced, which improves the colour if the colour of the product is orange, without affecting the viscosity or molecular weight. A drying stage is also introduced, where the final polymer is conditioned with lower levels of humidity and tetrahydrofuran, making a polymer that is more suitable for subsequent processing and for contact with food. The product obtained after the fifth phase, drying, can be temporarily stored.

Lastly, a compounding extrusion stage is introduced where all types of additives can be added for improving the polymer such as pigments, colouring agents, stabilizers, antioxidants, natural preservatives, nucleants, lubricants, strengtheners or fillers, hydrolytic, thermal or UV radiation degradation protectors, antiblocking agents, antistatic agents, thermoplastic starch, PLA, other biodegradable or biobased polymers, compounds that promote foaming, impact modifiers, flame retardants, anti-foaming agents and chain extenders so that it is useful for the final application.

All the information referring to examples of modes of embodiment, including the tables and FIGURES, form part of the description of the invention. In particular, the detail of each phase is referenced in the preferred embodiment of the invention.

An important advantage of the method described here compared to that contained in EP2628761 is that it enables obtaining the final polymer in the whole range of desired viscosities and that the final polymer is obtained with low levels of tetrahydrofuran (THF) by the inclusion of a drying stage and optionally an extraction stage, which also reduces the THF content.

Another advantage is that this polymer has an improved colour compared to the polymer obtained from other methods, where the improved colour means that the usual orange tone of the polymer obtained using other methods (colour a*>5, b*: 0-25 expressed in the CIELAB colour space coordinates) is reduced or even disappears. The final polymer obtained with this invention yields a colour in beige shades (colour a*<5, b*: 0-15 expressed in the CIELAB colour space coordinates), more commercially valued in the market.

Less use and where appropriate the elimination of toxic products in the method described brings another advantage, which is the higher assurance of quality in the use of the PEEA obtained in food contact applications. It enables obtaining much safer products from the health/food point of view and without limitations in food contact applications.

There is also an implicit financial saving resulting from less use or elimination of such chemical compounds, both for their own inherent cost to the product and for their effect on the overall cost of setting up the plant and energy consumption during the production process. Use of such dangerous chemical compounds requires dynamic mixers to be installed in-line at the end of the polymerisation, with very high energy consumption, amounting to approximately 10-20% of the consumption of the polymerisation plant. Installing these systems in-line in an industrial plant gives rise to a more complex facility to be designed and operated where complex and sophisticated equipment must be duplicated, and more control and measurement systems added. The implementation of an extraction system with water at moderate temperature and subsequent drying is, in terms of design and operation, much simpler and energetically more efficient than the conventional use of chemical compounds for increasing the viscosity.

It is also important to highlight that the final use of extrusion enables making much smaller batches tailored for each client in optimum conditions for each product. The versatility provided by the extrusion phase enables adapting easily to the particular needs of each client or order in terms of the necessary amount, viscosity, percentage fillers, additives, types and percentages of biobased compounds without creating interfaces.

DESCRIPTION OF THE FIGURES

In order to better understand the object of this invention, the diagram attached represents a preferred practical embodiment of the method for obtaining biodegradable polyesteretheramide.

FIG. 1 shows a simplified block diagram of the method.

PREFERRED EMBODIMENT OF THE INVENTION

The method for obtaining the biodegradable polyesteretheramide of this invention belongs to the class of methods based on aliphatic or aliphatic and aromatic dicarboxylic acids and aliphatic dihydroxy compounds, polyethertriamines and other monomers or additives and comprises various sequential stages (as shown in the attached FIGURE):

A first reaction stage of esterification and/or transesterification and amidation (1),
A second stage of prepolycondensation (2),
A third stage of polycondensation (3),
A fourth optional stage of extraction (4),
A fifth stage of drying (5),
A sixth stage of extrusion (6).

The first reaction stage of esterification and/or transesterification and amidation (1) comprises a first step (8) in which the raw materials (9) and other additives (10) are mixed in a paste-mixing tank and a second step (11) of continuous feed to a reactor with the raw materials already previously mixed and, optionally, a catalyst and other additives (12) in an esterification and/or transesterification and amidation reactor, obtaining an oligomer (13), with the term oligomer being understood as the already-reacted raw materials together with other additives such as stabilizers, antioxidants, colour correctors, branching agents and other monomers.

The second stage of prepolycondensation (2) comprises continuous feed of the already-reacted raw materials or oligomer (13) and optionally more catalyst and other additives (12) to a prepolycondensation reactor, obtaining a prepolymer (14).

The third stage of polycondensation (3) comprises a first step (15) of continuous feed of prepolymer to a polycondensation reactor obtaining a polymer with intrinsic viscosities in the range of 0.65 to 2.2 dl/g (60 to 320 $cm^3$/g according to DIN 53728) and a second step (16) in which the melted polymer is cooled and cut, converting it into chippings (17).

Next, a fourth extraction stage (4) may be performed that comprises washing the polymer chippings (17) obtained using water (18), which is preferably at a temperature of between 40° C. and 98° C. for a time that is preferably between 2 hours and 24 hours.

An expert in the art will understand that the range between 2 and 24 hours includes 4, 6, 8, 10, 12, 14, 16, 18, 20 and 22 hours as well as that the range between 40° C. and 98° C. includes 50° C., 60° C., 70° C., 80° C. and 90° C.

This optional extraction stage (4) may be of two types: continuous or discontinuous. In the continuous extraction stage, there is a continuous inflow and outflow of water (18) and of polymer (17), while in the discontinuous extraction stage, the polymer (17) and the water (18) are loaded into a container and held in contact for a time and then the water is completely refreshed (18), the cycle being repeated various times.

The fifth drying stage (5) comprises the drying of the polymer from the optional extraction stage (4), or directly of the polymer chippings (17) from the polycondensation stage (3), until achieving levels of humidity below 500 ppm and levels of tetrahydrofuran (THF) below 80 ppm.

Next, the product obtained in stage 5 is stored in chipping storage devices (7)

The method ends with the sixth extrusion stage (6) in which mixing is performed, in one or several compounding extruders, of the polymers from the temporary storage, together with the required additives (19) for improving the properties.

These required additives (19) are chosen from the group consisting of pigments, dyes, stabilizers, antioxidants, nucleants, lubricants, strengtheners or fillers, hydrolytic, thermal or UV radiation degradation protectors, antiblocking agents, antistatic agents, thermoplastic starch, PLA, other biodegradable or biobased polymers, compounds that promote foaming, impact modifiers, flame retardants, antifoaming agents and chain extenders.

The expert in the art will easily understand that the characteristics of different embodiments can be combined with characteristics of other possible embodiments whenever such a combination is technically possible.

A series of experimental examples obtained during the tests of the process is provided below. In examples 1, 2, 3 and 4, the results obtained regarding the reaction stages of esterification and/or transesterification and amidation (1), of prepolycondensation (2), of polycondensation (3), optional extraction (4) and drying (5) are shown.

For the experimental execution of these examples, a facility with four tanks connected in cascade was used, the first being the paste-mixer tank with stirring. The next three are the three reactors (esterification, prepolycondensation and polycondensation), which are tanks with stirring, sleeved, capable of withstanding a pressure of 5 bar and a vacuum, with a system for extraction and condensation of volatiles.

Start-Up of the Plant

The esterification reactor is heated to 240° C., 98 kg of 1,4-butanediol (BDO), 62.5 kg of terephthalic acid (TPA) and 66.8 kg of adipic acid (ADA) are added through the paste-mixer. The reaction is allowed to proceed for 4 hours, allowing water to escape through the distillation column. When the temperature of the column head started to reduce, the reaction is considered finished. Part of the product is discharged until approximately 100 kg remained inside the esterification reactor. This is called the "mother paste", to which the raw materials and additives are continuously added hereafter.

Example 1

To the paste-mixer are added 62.5 kg PTA, 66.8 kg ADA, 96 kg BDO, 6 kg polyethertriamine and 1 kg sodium sulfoisophthalic acid (SSIPA). They are mixed for 1 hour and 93 kg/h of the mixture is continuously passed to the esterification reactor, which contained 100 kg of the previously prepared mother paste at 240° C. and 400 mbar. In the esterification reactor, a flow of catalyst is added at 72 g/hour of tetrabutyl titanate (TNBT) at the top and a flow of 115 g/h of triethyl phosphate (TEP) through the side.

The raw materials are continuously input and the product (monomer or oligomer) flowed out at 72 kg/h and water and other volatiles through the column head.

The product obtained is in turn input at the same time as 24 g/h TNBT to a prepolycondensation reactor operating at 240° C. and 60 mbar to obtain the prepolymer, which is input to the polycondensation reactor, operating at 240° C. and 1-2 mbar. It is kept for a residence time of 3 hours and cut at the outflow. Then it is dried at 65° C. for a residence time of 6 hours and a polymer was obtained with the following properties:

Intrinsic viscosity of 1.19 dl/g;
Melt Volume Rate (MVR) (190° C./2.16 kg): 20.58 cc/10 min
Colour: L*a*b* de 76.57/8.44/18.94, expressed in the CIELAB colour space coordinates, ready for storage.

Example 2

To the paste-mixer are added 65 kg PTA, 63 Kg ADA, 96 kg BDO, 3 kg polyethertriamine and 1.5 kg SSIPA. They are mixed for 1 hour and 93 kg/h of the mixture is continuously passed to the esterification reactor, which contains 100 kg of the previously prepared mother paste at 240° C. and 400 mbar. In the esterification reactor, a flow of 72 g/h of TNBT is added.

The raw materials are continuously input and the product (monomer or oligomer) flows out at 70 kg/h and water and other volatiles through the column head.

The product obtained is in turn input at the same time as 24 g/h TNBT to a prepolycondensation reactor operating at 240° C. and 60 mbar to obtain the prepolymer, which is input to the polycondensation reactor, operating at 240° C. and 1-2 mbar. It is kept for a residence time of 2 hours and cut at the outflow. Then it is dried at 65° C. for a residence time of 6 hours and a polymer is obtained with the following properties:

Intrinsic viscosity: 1.15 dl/g
MVR (190° C./2.16 kg): 16.10 cc/10 min
Colour L*a*b*: de 72.5/19.5/22.8, expressed in the CIELAB colour space coordinates, ready for storage.

Example 3

To the paste-mixer are added 68 kg PTA, 61.8 kg ADA, 96 kg BDO, 7.5 kg polyethertriamine and 1.5 kg SSIPA. They are mixed for 1 hour and 93 kg/h of the mixture is continuously passed to the esterification reactor, which contained 100 kg of the previously prepared mother paste at 240° C. and 400 mbar. In the esterification reactor, a flow of 82 g/h of TNBT is added.

The raw materials are continuously input and the product (monomer or oligomer) flows out at 72 kg/h and water and other volatiles through the column head.

The product obtained is in turn input at the same time as 33 g/h TNBT to a prepolycondensation reactor operating at 240° C. and 60 mbar to obtain the prepolymer, which is input to the polycondensation reactor, operating at 240° C. and 1-2 mbar. It is kept for a residence time of 4.5 hours and cut at the outflow. Then it is dried at 65° C. for a residence time of 6 hours and a polymer is obtained with the following properties:

Intrinsic viscosity: 1.47 dl/g
MVR (190° C./2.16 kg): 3.94 cc/10 min.
Colour L*a*b*: of 70.6/12.0/20.5, expressed in the CIELAB colour space coordinates, ready for storage.

Example 4

To the paste-mixer are added 65 kg PTA, 63 kg ADA, 96 kg BDO, 3 kg polyethertriamine and 1.5 kg SSIPA. They are mixed for 1 hour and 93 kg/h of the mixture is continuously passed to the esterification reactor, which contained 100 kg of the previously prepared mother paste at 240° C. and 400 mbar. In the esterification reactor, a flow of 72 g/h of TNBT is added.

The raw materials are continuously input and the product (monomer or oligomer) flows out at 70 kg/h and water and other volatiles through the column head.

The product obtained is in turn input at the same time as 24 g/h TNBT to a prepolycondensation reactor operating at 240° C. and 60 mbar to obtain the prepolymer, which is input to the polycondensation reactor, operating at 240° C. and 1-2 mbar. It is kept for a residence time of 2 hours and cut at the outflow. A polymer is obtained with the following properties:

Intrinsic viscosity: 1.15 dl/g
MVR (190° C./2.16 kg): 16.10 cc/10 min
Colour L*a*b*: 72.5/19.5/22.8, expressed in the CIELAB colour space coordinates.

The polymer obtained is continuously fed into an extraction unit where it is mixed with a counter current of water at 70° C. for a residence time of 6 hours. Then it is dried at 65° C. for a residence time of 6 hours and a polymer is obtained with the following properties:

Intrinsic viscosity: 1.12 dl/g
MVR (190° C./2.16 kg): 23.6 cc/10 min
Colour L*a*b*: 77.1/11.2/20.0, expressed in the CIELAB colour space coordinates, ready for storage.

In the experimental trials, it was verified that after the optional extraction stage (4) at moderate temperatures, there is no significant fall in viscosity, so therefore this method is compatible with any desired viscosity. In terms of the MVR according to ISO 1133 at 190° C./2.16 kg, the method enables obtaining a polymer with a viscosity in the range between 3 and 50 cc/10 min.

In these experimental trials, it was verified that a polymer was obtained with an improved colour after the optional washing process (4), an improvement in colour meaning that the usual orange tone of conventional production processes was reduced or even disappeared, giving rise to a final polymer with a less orange colour, in beige tones, much more acceptable to the market.

In PEEA, values of L*a*b* are in the range: (63-84), (5-20), (14-27), in particular, values of a* higher than 5 give an orange tone to the polymer.

In the subsequent examples 5, 6, 7 and 8, the results obtained particularly relating to the extrusion stage (6) with additives are shown.

Example 5

100 kg of the product obtained in Example 1 was loaded into a dosing hopper in a ZSK26, D COPERION extruder: 26 mm, L/D: 40. A temperature profile of 230-230-235-235-240-240° C. is set and when this had been achieved, 200 rpm is set, the extruder motor is started and the product is prepared with 69% PEEA (Example 1), 30% calcium carbonate, 1% erucamide. A product is obtained with MVR (190° C./2.16 kg): 12 cc/10 min, suitable for injection part applications.

Example 6

100 kg of the product obtained in Example 2 is loaded into a dosing hopper in a ZSK26, D COPERION extruder: 26 mm, L/D: 40. A temperature profile of 160-160-165-165-170-170° C. is set and when this had been achieved, 200 rpm is set, the extruder motor is started and the product is prepared with 30% PEEA (Example 2), 50% PBS, 10% PHA, 9% calcium carbonate and 1% ethylene bis stearamide. A product is obtained with MVR (190° C./2.16 kg): 14 cc/10 min, suitable for injection part applications.

Example 7

100 kg of the product obtained in Example 4 is loaded into a dosing hopper in a ZSK26, D COPERION extruder: 26 mm, L/D: 40. A temperature profile of 160-160-165-165-170-170° C. is set and when this had been achieved, 200 rpm is set, the extruder motor is started and the product is prepared with 50% PEEA (Example 2), 30% PBS, 9% PHA, 10% calcium carbonate, 1% ethylene bis stearamide. A product is obtained with MVR (190° C./2.16 kg) of 3.4 cc/10 min, suitable for blown film extrusion applications.

Example 8

100 kg of the product obtained in Example 3 is loaded into a dosing hopper in a ZSK26, D COPERION extruder: 26 mm, L/D: 40. A temperature profile of 230-230-235-235-240-240° C. is set and when this had been achieved, 200 rpm was set, the extruder motor is started and the product is prepared with 99.3% PEEA (Example 2), 0.5% erucamide and 0.2% amorphous silica. A product is obtained with MVR (190° C./2.16 kg): 4.2 cc/10 min, suitable for blown film extrusion applications.

Experimental trials are also performed on the biodegradation of the polyesteretheramide obtained, and the results are shown in Example 9. The definition and methods of measurement of biodegradation specified in the UNE-EN 13432 standard were used.

According to UNE-EN 13432, biodegradability is considered to be the decomposition of an organic chemical compound by microorganisms in the presence of oxygen to give carbon dioxide, water, mineral salts of any other element present (mineralisation) and new biomass; or, in the absence of oxygen to give carbon dioxide, methane, mineral salts and new biomass.

The UNE-EN 13432 standard refers to containers and packaging that are valorised by composting and biodegradation. For a container or packaging, or the material of a container of packaging or a component of a container or packaging to be considered organically biodegradable according to UNE-EN 13432, at least 90% of total biodegradation or 90% of maximum biodegradation must have been completed in six months to a suitable reference substance (normally microcrystalline cellulose powder).

According to the UNE-EN 13432 standard, only those laboratory assays of biodegradation that provide unequivocal information on the ultimate and inherent biodegradability of a material or container or packaging or its major organic component must be used.

Point 6 of the UNE-EN 13432 standard (Requirements of containers and packaging that can be valorised through composting and biodegradability) indicates that the controlled aerobic composting test, described in the ISO 14855:1999 standard (Determination of the aerobic biodegradability in plastic materials under controlled composting conditions) must be used if it is not inappropriate for the type and properties of the material under test.

Example 9

The polymer obtained in Example 1 and Example 3 was subjected to aerobic biodegradation test according to ISO 14855:1999.

80 g PEEA obtained in Examples 1 and 3 were crushed to a powder of particle size less than 200 µm and each mixed with 480 g of compost. They were incubated at 58° C. for 180 days. A reference of microcrystalline cellulose was prepared in the same way (REF: 310697-500G).

2-litre containers were used with perforated bottoms through which humidified air was constantly passed. The humidity of the compost was maintained at 50%. Three (3) replicas were prepared and sampled from each sample. The concentration of $CO_2$ generated by the reaction of the microbes was measured each day by acid-base titration. The following table shows the results of the biodegradation of PEEA of Examples 1 and 3 and of the reference.

|  | Mean % Biodegradability calculated from generated CO2 | Mean % Biodegradability calculated from the weight of organic matter | Test Duration |
| --- | --- | --- | --- |
| Example 1 | 99.85 (176 days) | 98.89 | 180 days |
| Example 3 | 99.56 (179 days) | 98.62 | 180 days |
| Reference | 99.63 (111 days) | 98.80 | 180 days |

The invention claimed is:
1. A method for obtaining a biodegradable polyesteretheramide, comprising:
a first stage, comprising the steps of
providing dicarboxylic acids, wherein the dicarboxylic acids are selected from the group consisting of (a)

aliphatic dicarboxylic acids; and (b) a mixture of aliphatic and aromatic dicarboxylic acids, providing aliphatic dihidroxy compounds, providing polyethertriamines, reacting the dicarboxylic acids with the aliphatic dihidroxy compounds to produce water and ester compounds, reacting the polyethertriamines with the dicarboxylic acids to produce water and amide compounds, reacting the ester compounds with the amide compounds to produce oligomers, wherein the first stage occurs at about 240° C., in vacuum conditions, and wherein a catalyst, color correction additives and branching additives are introduced in the first stage;

a second stage, comprising the step of reacting the oligomers produced in the first stage with one another under vacuum conditions to produce prepolymers, wherein the second stage occurs at a temperature of about 240° C., under vacuum conditions;

a third stage comprising the steps of
reacting the prepolymers with one another at a temperature of about 240° C. under vacuum conditions to produce a polymer chain, wherein a high viscosity biodegradable polyesteretheramide is obtained,
sending the biodegradable polyesteretheramide to a cutter to be cut to produce chippings,
cooling the biodegradable polyesteretheramide,
wherein the biodegradable polyesteretheramide is cooled and cut;

a fourth optional stage comprising the step of contacting the chippings with water at a temperature of 40-98° C., wherein a decrease of orange color is achieved by said fourth stage, and wherein the duration of the fourth optional stage is between 2 hours and 24 hours;

a fifth stage comprising the step of drying the chippings; and a sixth stage of extrusion, comprising the step of introducing the chippings, together with additives, to an extruder, wherein the chippings are melted, mixed with the additives and cooled, and wherein a reduction of orange color is achieved by said sixth stage.

2. The method for obtaining a biodegradable polyesteretheramide according to claim 1 characterised in that the second stage comprises the continuous feed of the already reacted dicarboxylic acids, dihydroxy compounds, and polyethertriamines or oligomer and optionally more catalyst and other additives to a prepolycondensation reactor.

3. The method for obtaining a biodegradable polyesteretheramide according to claim 1 characterised in that the third stage comprises a first step of continuous feed of prepolymer to a polycondensation reactor, obtaining a polymer with intrinsic viscosities in the range of 0.65 to 2.2 dl/g (60 to 320 cm$^3$/g according to DIN 53728) and a second step in which this melted polymer is cooled and cut, converting it into chips.

4. The method for obtaining a biodegradable polyesteretheramide according to claim 1 characterised in that the fourth optional stage is continuous, with continuous inflow and outflow of water and of polymer.

5. The method for obtaining a biodegradable polyesteretheramide according to claim 1 characterised in that the fourth optional stage is discontinuous, loading the polymer and the water into a container, keeping them in contact for a time and then completely renewing the water and repeating this cycle several times.

6. The method for obtaining a biodegradable polyesteretheramide according to claim 1 characterised in that the fifth stage comprises drying of the polymer from the fourth optional stage, or directly of the chippings from the third stage until reaching humidity levels of less than 500 ppm of humidity and levels of tetrahydrofuran (THF) of less than 80 ppm.

7. The method for obtaining a biodegradable polyesteretheramide according to claim 1 characterised in that the product obtained in the fifth stage is temporarily stored in chipping storage devices.

8. The method for obtaining a biodegradable polyesteretheramide according to claim 1 characterised in that additives used in the sixth stage are selected from the group consisting of pigments, colouring agents, stabilizers, antioxidants, nucleants, lubricants, strengtheners or fillers, hydrolytic, thermal or UV radiation degradation protectors, antiblocking agents, antistatic agents, thermoplastic starch, PLA, other biodegradable or biobased polymers, compounds that promote foaming, impact modifiers, flame retardants, anti-foaming agents and chain extenders.

9. The method for obtaining a biodegradable polyesteretheramide according to claim 1 characterised in that the first stage comprises a first step in which the dicarboxylic acids and aliphatic dihydroxy compounds, polyethertriamines and other monomers or additives are mixed in a paste-mixer tank, and a second step of continuous feed to the reactor of the previously mixed raw materials and optionally a catalyst and other additives to an esterification and/or transesterification and amidation reactor.

10. The method for obtaining a biodegradable polyesteretheramide according to claim 8 characterised in that the sixth stage is performed by one or several compounding extruders wherein the chippings obtained in the fifth stage, together with the additives required are mixed to improve their properties.

* * * * *